Patented Feb. 6, 1945

2,369,097

UNITED STATES PATENT OFFICE 2,369,097

PEST CONTROL

Stanley D. Wilkins, Berkeley, Calif., assignor to California Pellet Mill Company, San Francisco, Calif., a corporation of California No Drawing. Application September 21, 1940, Serial No. 357,763

1 Claim. (Cl. 71—4)

My invention relates to the control of pests, and more particularly to the control of pests that attack the roots of growing plants and preclude normal development thereof.

In the cultivation of many crops, it is found that satisfactory growth and development thereof is precluded by the fact that such crops are subject to attack by pests, which, if not controlled, bring about a poor quality and yield, if not a complete failure thereof. Many of these pests operate by attacking the roots of plants, and it is to this particular type of pest that the present invention pertains. When a field is found to be infested with a pest known to attack a particular plant, cultivation of the field with such crop is avoided, the land being given over to crops which are known to be immune to the particular pest in question. This is true of sugar beets, which are known to be detrimentally affected by the presence of the sugar beet nematode in the soil. Studies of this pest show that in one stage of its development, namely the cyst stage, the nematode may remain dormant for several years, which necessitates a strict rotation practice, in which the period between successive beet crops should be at least five years, during which period care must be exercised to keep the field clear of such weeds or other volunteer plants which may serve as hosts to the sugar beet nematode.

A considerable amount of research has gone into the study of the problem of the control of pests which attack plant roots, resulting, among other things, in attempts to solve the problem by the spraying of liquid chemicals over the infested soil, or scattering such chemicals in powdered or crystalline form and then dissolving them into the soil, the object being to cover the area and thus rid the entire field of the pests. Such attempts, however, have not proven satisfactory.

It is my belief that successful results from such attempts were lacking, due primarily to the fact that the method of treatment did not lend itself to the application of appreciable quantities of the control ingredients to the infested layers of the soil. Penetration of the chemical into the soil being dependent, in large measure, upon soil condition, only a small portion of the limited quantity applied might ever reach regions of the soil below the surface. Thus, if the soil be too compact, or is permitted to harden into a dry crust on the surface, penetration is difficult and insufficient to do much good. On the other hand, if the soil be too loose, such chemicals will be washed down to regions beyond the infested upper layers of soil by irrigation water or rainfall. In any event, due to these possibilities, practically little, if any, of the chemical which has been scattered upon the surface of the soil, comes to a state of rest in the infested layers of the soil, and what small percentage might, would be insufficient to function over any appreciable period of time. Even though such treatment may conceivably bring about a certain reduction in the degree of infestation of portions of the soil during such short period of exposure to the chemicals, a sufficient number of the pests remain unaffected, to restore the condition of the soil to its original condition of infestation, in time to seriously injure the growing crop.

I have discovered that it is not necessary to rid the complete field of such pests to obtain satisfactory results, but that by exposing the root regions only of plants in a soil infested area, to suitable pest control chemicals or agents, and maintaining such exposure over a prolonged period of time, the plants will attain a full, luxuriant growth, after which they have the ability to continue growth and development without any noticeable damage from subsequent attacks of such pests, should they again infest such regions before the plant reaches maturity. Growing plants appear to be particularly susceptible to the effect of such pests, during an early period of plant growth after the root structure has developed somewhat but is still young and tender and highly sensitive to abnormal conditions. In the case of sugar beets with which I am particularly familiar, the plant reaches this stage at about two or three weeks following germination of the seed. When protected from attack throughout this sensitive period and the plant is given an opportunity to reach a later stage of healthy growth, the plant seems to have then developed to a point where it is capable of resisting to a high degree any subsequent inroads by the pests.

Accordingly, my invention has among its objects, to provide a novel and improved manner of pest control—

(1) Which will effectively protect growing plants throughout periods of growth, during which they are highly susceptible to attack.

(2) Which involves the use of chemicals, but serves to prolong the effect thereof over an extended period of time, (3) Which functions to promote growth and strengthen the plant to better withstand disease, while protecting the same during sensitive stages of growth, against such disease taking hold, (4) Which shall in one operation provide protection from pests over a substantial period, (5) Which shall enable localization of its protective influence to the root regions of a growing plant, and (6) Which shall be economical to carry into practice.

Additional objects of my invention will be brought out in the following description of the same.

To carry out the objects of my invention and obtain the prolonged exposure of the root region of a plant to the active pest control chemical, I consolidate a suitable chemical into pellet form. This may be accomplished by mixing the chemical with some approximately inert ingredient, such as fuller's earth, diatomaceous earth, or sawdust, and a small quantity of a binder such as molasses for example, and running the same, preferably, through a mill to form pellets from the mixture.

The control pellets may be broadcast and subsequently concentrated during the formation of the seed bed prior to planting the seed, so that the pellets will for the most part be buried in the regions which are to constitute the root regions of the plants. The pellets might, if desired, be broadcast following the planting of the seed, and then concentrated in the seed bed areas by hoeing or otherwise. In either case, the pellets will become buried in the soil in more or less localized regions of root growth, and a slow disintegration of the pellets, under the effects of soil conditions, will begin.

Another method of application is to plant a suitable number of pellets in each seed hole, along with the seed. This offers greater assurance of localizing pellets in the proper regions, and through such assurance, renders this method of application considerably more economical, in that the pellets are buried in one operation with the seed, thereby eliminating the extra operations which the previous methods of broadcasting would entail. At the same time, a considerable reduction in the amount of pellet material required, is realized, in that the pellets are placed where needed.

Although, as indicated above, the pellets may be consolidated by a mixture of the pest control ingredient and an inert material, a fertilizer might to advantage be added to the mixture prior to pelleting the same. Preferably, however, the fertilizer might be substituted for the inert component, as a greater quantity thereof can thereby be incorporated into the pellet.

The compaction or consolidation of the mixture into pellet form, enables concentrating a relatively large amount of the various ingredients into a small volume, with the pest control ingredient bound up in the base material and dependent for its release upon the disintegration of the pellet. This, coupled with the fact that the density of material resulting from the consolidation thereof retards the disintegration of the pellet, not only precludes the material from being washed down rapidly to the lower layers of soil below the root regions, but holds the same in the desired localized regions of root growth and offers the means for releasing the ingredients thereof slowly enough to maintain effectiveness, both from the viewpoint of fertilization and pest control, over a prolonged period of time. Such period of effectiveness can be regulated, if desired, by the size of the pellet and the density of consolidation. Pellets formed for this purpose have shown signs of incomplete disintegration even after periods as long as two to three months, and such periods could be conveniently extended, if conditions warranted, through the enlargement of the pellets and increase in density, as indicated above.

The inclusion of the fertilizer ingredient is an important feature, in that it serves to promote and hasten healthful, disease resistant growth, while the pest control component is simultaneously functioning to permit such growth entirely free from interference during periods when such plants may be particularly susceptible to the effects of pest attacks. Such cooperation can only be obtained through simultaneous functioning of both the fertilizer and pest control ingredients in the root regions of the plants. The compacted pellet makes this possible and in an exceedingly convenient and economical manner.

As a fertilizer component for use in the manufacture of pellets for the purpose of pest control, I preferably employ a cotton seed meal, this being rich in plant food including nitrogen, besides having characteristics conducive toward facilitating pelleting of the mixture. To this cotton seed meal may be added a small amount of dry treble super phosphate, this ingredient having a certain root growth stimulating value. The cotton seed meal, with or without the phosphate, constitutes the major portion of the bulk of the pellet mixture, of the order of 93.6% by weight, and this, when mixed with the molasses binder, in an amount of the order of 5% by weight, together will constitute the base to which the pest control ingredient is added. This ingredient may vary chemically, in accordance with the pest to be controlled.

In the case of the sugar beet nematode and such other pests as may be similarly affected, I have found that a compound high in chlorine content, such as calcium hypo-chlorite, is quite effective. This compound is preferably added in powder form, in the ratio of the order of 1.4% by weight, to the fertilizer and molasses, and thoroughly mixed therewith prior to pelleting the mixture.

For other pests, not controllable by a high chlorine content compound, other known effective agents may be utilized in place thereof, and the proportions of the ingredients in the pellet mixture may be adjusted somewhat to the plant and pest characteristics in connection with which the pellets are to be employed for control purposes.

The formula given above for use in the control of the sugar beet nematode, has shown exceptionally good results. While I am not prepared as yet to state with any degree of certainty whether the control element actually destroys the pest or merely acts as a repellent or deterrent to growth, a single application has, during a period of two months, produced a healthy, luxuriant growth of sugar beets, in what was a heavily infested area, and the roots of the plants in this treated area showed little signs of the pest. There is some evidence that the control ingredient causes the cyst, which contains the nematode eggs, to disgorge itself of the same, thus eventually killing the source from which the pests originate.

My method of pest control, by enabling the growth of luxuriant crops in a heavily infested soil, eliminates the necessity of crop rotation, thus making it possible for a grower to govern the type of crop to be planted, by conditions on the market, rather than by the condition of the soil available for planting as was formerly the case.

While I have disclosed my invention in detail, in its broadest aspects, it involves the idea of pest control treatment through prolonged exposure of root regions of plants to the control, and in a more restrictive sense, the invention resides in the manner of attaining such prolonged exposure by pelleting the control material with or without a fertilizer component, whereby the rate of release of the control factor is, in large measure, governed by the disintegration of the pellet, which disintegration is in turn a function of pellet size and density, both of which may be varied to suit conditions. The invention is susceptible to change and alteration, without departing from the scope thereof, and I accordingly do not desire to be limited in my protection to the details set forth, except as may be necessitated by the prior art and the appended claim.

I claim:

An article of manufacture for use in the culture of sugar beets or the like comprising a mixture including a cotton seed meal base and a compound having a high releasable chlorine content compacted into a substantially dense pellet.

STANLEY D. WILKINS.